US008047913B2

(12) United States Patent
Moshal

(10) Patent No.: US 8,047,913 B2
(45) Date of Patent: Nov. 1, 2011

(54) SYSTEM FOR PLAYING A GAME

(75) Inventor: Martin Moshal, Marina Bay (GI)

(73) Assignee: Waterleaf Limited, Douglas (IM)

( * ) Notice: Subject to any disclaimer, the term of this patent is extended or adjusted under 35 U.S.C. 154(b) by 1416 days.

(21) Appl. No.: 10/513,140

(22) PCT Filed: Apr. 25, 2003

(86) PCT No.: PCT/IB03/01583

§ 371 (c)(1),
(2), (4) Date: May 23, 2005

(87) PCT Pub. No.: WO03/093921

PCT Pub. Date: Nov. 13, 2003

(65) Prior Publication Data

US 2005/0209001 A1 Sep. 22, 2005
US 2006/0063593 A2 Mar. 23, 2006

(30) Foreign Application Priority Data

Apr. 30, 2002 (GB) .................................. 0209865.5
May 16, 2002 (GB) .................................. 0211206.8

(51) Int. Cl.
*A63F 9/24* (2006.01)
*A63F 13/00* (2006.01)

(52) U.S. Cl. ................ 463/25; 463/29; 463/40; 463/42; 463/43

(58) Field of Classification Search .................... 463/13, 463/40, 42, 25–29
See application file for complete search history.

(56) References Cited

U.S. PATENT DOCUMENTS 3,810,627 A * 5/1974 Levy .............................. 463/26
4,335,809 A * 6/1982 Wain .............................. 463/20
4,614,342 A * 9/1986 Takashima ...................... 463/11
4,636,951 A * 1/1987 Harlick .......................... 463/25
4,760,527 A * 7/1988 Sidley ............................ 463/13
4,926,327 A * 5/1990 Sidley ............................ 463/13
(Continued)

FOREIGN PATENT DOCUMENTS

WO WO 01/50391 A1 7/2001

OTHER PUBLICATIONS

Supplementary European Search Report for Application No. EP 03 71 7463 May 22,2006.

(Continued)

*Primary Examiner* — Melba Bumgarner
*Assistant Examiner* — Steven J Hylinski
(74) *Attorney, Agent, or Firm* — McDonnell Boehnen Hulbert & Berghoff LLP

(57) ABSTRACT

A system for playing a multiplayer zero-sum game includes a gaming server operable under program control to regulate the progress of at least one instance of the multiplayer zero-sum game by a predetermined plurality of players, a user access facility corresponding to each player, a plurality of portals associated with a plurality of competing game provider entities, and a clearing account facility having a separate clearing account for each game provider entity. Each user access facility is operable by a player to access the gaming server for participation in the at least one instance of the multiplayer zero-sum game through a selectable one of the plurality of portals, wherein each portal can be logically connected to a plurality of user access facilities simultaneously.

82 Claims, 4 Drawing Sheets

U.S. PATENT DOCUMENTS

| | | | | | |
|---|---|---|---|---|---|
| 5,038,022 | A | * | 8/1991 | Lucero | 463/25 |
| 5,083,271 | A | * | 1/1992 | Thacher et al. | 700/92 |
| 5,096,195 | A | * | 3/1992 | Gimmon | 463/20 |
| 5,159,549 | A | * | 10/1992 | Hallman et al. | 463/26 |
| 5,457,305 | A | * | 10/1995 | Akel et al. | 705/45 |
| 5,476,259 | A | * | 12/1995 | Weingardt | 463/28 |
| 5,505,449 | A | * | 4/1996 | Eberhardt et al. | 463/29 |
| 5,559,312 | A | * | 9/1996 | Lucero | 463/25 |
| 5,586,257 | A | * | 12/1996 | Perlman | 463/42 |
| 5,613,912 | A | * | 3/1997 | Slater | 463/25 |
| 5,655,961 | A | * | 8/1997 | Acres et al. | 463/27 |
| 5,674,128 | A | * | 10/1997 | Holch et al. | 463/42 |
| 5,735,525 | A | * | 4/1998 | McCrea, Jr. | 273/309 |
| 5,761,647 | A | * | 6/1998 | Boushy | 705/10 |
| 5,762,552 | A | * | 6/1998 | Vuong et al. | 463/25 |
| 5,768,382 | A | * | 6/1998 | Schneier et al. | 380/251 |
| 5,770,533 | A | * | 6/1998 | Franchi | 463/42 |
| RE35,864 | E | * | 7/1998 | Weingardt | 463/28 |
| 5,779,549 | A | * | 7/1998 | Walker et al. | 463/42 |
| 5,800,268 | A | * | 9/1998 | Molnick | 463/40 |
| 5,800,269 | A | * | 9/1998 | Holch et al. | 463/42 |
| 5,809,482 | A | * | 9/1998 | Strisower | 705/30 |
| 5,823,879 | A | * | 10/1998 | Goldberg et al. | 463/42 |
| 5,833,540 | A | * | 11/1998 | Miodunski et al. | 463/42 |
| 5,841,980 | A | * | 11/1998 | Waters et al. | 709/204 |
| 5,851,149 | A | * | 12/1998 | Xidos et al. | 463/42 |
| 5,857,911 | A | * | 1/1999 | Fioretti | 463/40 |
| 5,970,143 | A | * | 10/1999 | Schneier et al. | 713/181 |
| 5,974,566 | A | | 10/1999 | Ault et al. | 714/15 |
| 6,001,016 | A | * | 12/1999 | Walker et al. | 463/42 |
| 6,012,984 | A | * | 1/2000 | Roseman | 463/42 |
| 6,015,348 | A | * | 1/2000 | Lambright et al. | 463/42 |
| 6,089,982 | A | * | 7/2000 | Holch et al. | 463/42 |
| 6,117,011 | A | * | 9/2000 | Lvov | 463/25 |
| 6,165,072 | A | * | 12/2000 | Davis et al. | 463/29 |
| 6,183,362 | B1 | * | 2/2001 | Boushy | 463/25 |
| 6,183,366 | B1 | * | 2/2001 | Goldberg et al. | 463/42 |
| 6,196,920 | B1 | * | 3/2001 | Spaur et al. | 463/42 |
| 6,224,486 | B1 | * | 5/2001 | Walker et al. | 463/42 |
| 6,241,608 | B1 | * | 6/2001 | Torango | 463/27 |
| 6,257,981 | B1 | * | 7/2001 | Acres et al. | 463/26 |
| 6,264,560 | B1 | * | 7/2001 | Goldberg et al. | 463/42 |
| 6,302,793 | B1 | * | 10/2001 | Fertitta et al. | 463/25 |
| 6,352,479 | B1 | * | 3/2002 | Sparks, II | 463/42 |
| 6,371,852 | B1 | * | 4/2002 | Acres | 463/25 |
| 6,394,907 | B1 | * | 5/2002 | Rowe | 463/42 |
| 6,435,968 | B1 | * | 8/2002 | Torango | 463/27 |
| 6,532,448 | B1 | * | 3/2003 | Higginson et al. | 705/14.14 |
| 6,626,757 | B2 | * | 9/2003 | Oliveras | 463/13 |
| 6,656,040 | B1 | * | 12/2003 | Brosnan et al. | 463/16 |
| 6,679,777 | B2 | * | 1/2004 | Pfeiffer et al. | 463/42 |
| 6,692,353 | B2 | * | 2/2004 | Walker et al. | 463/16 |
| 6,712,702 | B2 | * | 3/2004 | Goldberg et al. | 463/42 |
| 6,767,284 | B1 | * | 7/2004 | Koza | 463/29 |
| 6,837,789 | B2 | * | 1/2005 | Garahi et al. | 463/29 |
| 6,866,586 | B2 | * | 3/2005 | Oberberger et al. | 463/42 |
| 6,884,166 | B2 | * | 4/2005 | Leen et al. | 463/16 |
| 6,887,151 | B2 | * | 5/2005 | Leen et al. | 463/16 |
| 6,887,159 | B2 | * | 5/2005 | Leen et al. | 463/42 |
| 6,893,347 | B1 | * | 5/2005 | Zilliacus et al. | 463/41 |
| 6,899,628 | B2 | * | 5/2005 | Leen et al. | 463/42 |
| 6,979,267 | B2 | * | 12/2005 | Leen et al. | 463/42 |
| 7,113,975 | B2 | * | 9/2006 | Nakayama et al. | 709/204 |
| 7,128,652 | B1 | * | 10/2006 | Lavoie et al. | 463/42 |
| 7,186,181 | B2 | * | 3/2007 | Rowe | 463/42 |
| 7,240,093 | B1 | * | 7/2007 | Danieli et al. | 709/205 |
| 7,384,336 | B2 | * | 6/2008 | Torango | 463/27 |
| 7,387,571 | B2 | * | 6/2008 | Walker et al. | 463/26 |
| 7,419,428 | B2 | * | 9/2008 | Rowe | 463/25 |
| 7,699,702 | B2 | * | 4/2010 | Daniel | 463/29 |
| 7,722,466 | B2 | * | 5/2010 | Rothschild | 463/42 |
| 2001/0037253 | A1 | | 11/2001 | Kensey | 705/26 |
| 2002/0094869 | A1 | * | 7/2002 | Harkham | 463/42 |
| 2002/0138594 | A1 | * | 9/2002 | Rowe | 709/219 |
| 2002/0147047 | A1 | * | 10/2002 | Letovsky et al. | 463/42 |
| 2003/0069071 | A1 | * | 4/2003 | Britt et al. | 463/42 |
| 2004/0254010 | A1 | * | 12/2004 | Fine | 463/25 |
| 2010/0228619 | A1 | * | 9/2010 | Goldberg et al. | 705/14.43 |

OTHER PUBLICATIONS

Fielding et al., "Hypertext Transfer Protocol—HTTP/1.1," HTTP Protocol: Standards Track, [Online] Jun. 1999, pp. 1-114, XP-002372611.

Stojanovic et al., "On Enhancing Searching for Information in an Information Portal by Tracking Users' Activities," Web Information Systems Engineering (Workshops), 2002. Proceedings of the Third International Conference on Dec. 11, 2002, Piscataway, NJ, USA, IEEE, 2002, pp. 246-255, XP010631018.

* cited by examiner

SYSTEM FOR PLAYING A GAME

FIELD OF THE INVENTION

This invention relates to a system for playing a game, more specifically, a multiplayer zero-sum game and, in particular, to a system for playing a multiplayer zero-sum game on which wagers may be placed, such as multiplayer poker. The invention extends to the method of operation of the system for playing the game.

BACKGROUND TO THE INVENTION

The game of poker is widely played in many jurisdictions, particularly in the United States of America. A traditional game of poker is a multiplayer game, generally accommodating a minimum of 4 and a maximum of between 8 and 10 players. In a turn of the game, one of the participating players assumes the role of a dealer and deals five cards (an "initial hand"), from a conventional deck of 52 playing cards, to each participating player, inclusive of the dealer. The playing cards in the initial hand are dealt face down to each player who does not, at this stage of the game, disclose the playing cards that have been dealt to him.

Each one of the players is then required to decide, in turn, whether to continue with his participation in the turn of the game (that is, to "play"), or to terminate his participation in the turn (that is, to "fold"), as a function of the playing cards in his initial hand. Any player who decides to fold does not participate any longer in the turn of the game. If all participating players decide to fold, the turn of the game terminates. The first player to decide to play is required to make an opening wager on the turn of the game. Any other player who subsequently also decides to play in the turn of the game is required to match or to increase ("raise") the size of the opening wager. When the size of the opening wager is raised, players who have made prior opening wagers are required to top up their wagers to match the size of the largest opening wager made by any player who has elected to play in the turn of the game. This phase of the turn of the game continues until every player who desires to play in that turn has made an equivalent opening wager.

All the wagers made by each of the players are accumulated in a single jackpot ("the pot").

At this stage of the game, each player who has decided to play may, in turn, then decide to retain (that is, to "hold") any one or more of the five cards in his initial hand. Once a player has decided which, if any, of the five cards to hold, the player may then "draw", in which the remaining cards of the initial hand are discarded and are replaced by an equivalent number of further cards dealt by the dealer from the deck of playing cards. This phase of the game will be referred to, for convenience, as the drawing phase. If the player does not hold any of the cards in his initial hand, he is then effectively dealt an entirely new hand of five cards at the drawing phase of the game. On the other hand, if a particular player holds all of the five cards in his initial hand, he does not participate in the drawing phase, but still continues to play in the turn of the game.

Once the drawing phase of the game has been completed, each player evaluates the five cards that he has accumulated in the manner described above in order to determine whether they contain any one of a number of desirable combinations of playing cards. The desirability of any combination of playing cards is inversely proportional to the probability of being dealt that particular combination of cards. For a standard deck of 52 playing cards, desirable combinations of playing cards are, in order of increasing desirability: a pair of cards having the same rank ("one pair"); two pairs of cards in which the rank of each pair is different ("two pairs"); three cards each having the same rank ("three of a kind"); a "straight" in which the five cards of a hand are in sequentially increasing rank order, with no restriction on suite; a "flush" in which the five cards are all of the same suite; a "full house" in which three cards are each of the same rank, while the remaining two cards each have another identical rank; "four of a kind" in which four cards of the hand each have the same rank; a "straight flush" in which the five cards are in sequentially ascending rank order and are all of the same suite; and a "royal flush" in which the five cards are all of the same suite and are ranked Ace, King, Queen, Jack and 10. Where a deck is used that has fewer than 52 cards, the probability of being dealt a full house is greater than being dealt a flush, making the latter combination of cards more desirable than the former.

After completion of the drawing phase of the turn of the game and evaluation of the playing cards, all the players who have previously decided to play in the particular turn of the game are then again required to decide, in turn, as a function of the playing cards they have accumulated in the manner described above, whether to continue playing or to fold. If all these players decide to fold, the turn of the game terminates. The contents of the pot are carried forward to the next turn of the game. Any player who decides to fold does not participate any further in the particular turn of the game and forfeits all the wagers, he has made in that turn. The first player who made an opening wager may, if he decides to play, make a supplementary wager on the turn of the game. Any other player who subsequently also decides to play is required to match or to raise the size of the supplementary wager. Players who have previously made supplementary wagers are required to top up their supplementary wagers to match the size of the largest supplementary wager. This phase of the particular turn of the game continues until every player who has not folded has made an equivalent supplementary wager. This stage of the game will be referred to, for convenience, as the supplementary wagering stage.

The supplementary wagers made by each of the players who have decided to continue playing in the particular turn of the game are added to the pot.

Once the supplementary wagering stage of the turn of the game has been completed, the players who remain in the game reveal the playing cards in their hands. The hands are compared, and the player with the highest-ranking desirable hand wins the accumulated pot.

The rules of the game of poker have been described with particular reference to a variation of the game called "draw poker". There are many other variations of the game of poker that are not germane to the essence of the invention and that will not, for this reason, be described here in detail.

It will be appreciated by those skilled in the art that the game of poker is a zero-sum game insofar as, in each turn of the game, a gain of the winner is equal to accumulated losses of the other players in the game. It is, however, also known for a party who arranges or hosts a game of poker to levy a commission ("a rake") on the players or on the accumulated jackpot in order to obtain revenue.

The game of poker is played at both land-based and on-line casinos, at the latter by means of the World Wide Web of the Internet. A general feature of such arrangements is that a player may only play in a poker game at which an unoccupied playing position, or vacancy, exists. If a poker game has no vacancies available, a would-be player may have to wait a considerable time before a vacant playing position becomes available, allowing the player to join the game, which causes frustration and which may cause the would-be player to leave the casino. Conversely, a would-be player may also have to wait for a considerable period before a sufficient number of other would-be players become available to establish a poker game and to enable play to commence, which may also cause frustration and lead to player attrition. Both of these situations are tedious and, particularly in an on-line environment, costly in terms of connection charges to the World Wide Web of the Internet.

OBJECT OF THE INVENTION

It is an object of this invention to provide a system for playing a multiplayer zero-sum game, and to a method of operation thereof that will, at least partially, alleviate the abovementioned difficulties and disadvantages.

SUMMARY OF THE INVENTION

In accordance with this invention there is provided a system for playing a multiplayer zero-sum game, comprising:

a gaming server operable under program control to regulate the progress of at least one instance of the zero-sum game, the gaming server enabling participation in the at least one instance of the zero-sum game by a predetermined plurality of players;

a number of portals communicable with the gaming server by means of a communication network;

a user access facility corresponding to each player, each user access facility being operable by a player to access the gaming server along the communication network through a selectable one of the number of portals;

a register of players participating in the at least one instance of the game, the register including, for each participating player, data representative of a corresponding portal through which the player accessed the gaming server;

a wagering means operable by each player to place a wager on the at least one instance of the zero-sum game; and discrimination means responsive to progress of the at least one instance of the zero-sum game to determine whether a wager placed thereon by any one of the participating players is successful or unsuccessful.

Further features of the invention provide for the gaming server to be operable under program control to initiate a further instance of the zero-sum game when all previous instances of the game have the predetermined plurality of participating players, for the system to include an administration facility operable to legislate access at any time to any instance of the game by any would-be player requesting participation in the game, as a function of a number of players currently participating in that instance of the game, for the administration facility to enable participation in any instance of the game by players requesting participation through any one of the number of portals, and for the register to include data corresponding to each participating player in every instance of the game, the data being representative of an instance of the game in which that player is participating, and representative of a corresponding portal through which that player accessed the gaming server.

Still further features of the invention provide for the system to include a clearing account facility having a clearing account corresponding to each one of the number of portals, for each portal to include a corresponding sub-register of players participating in any instance of the zero-sum game through that portal, for each portal to have a corresponding credit account facility having a credit account corresponding to each player in its sub-register of players, for the system to include credit dispensing means capable of dispensing purchased credit to any player participating in any instance of the zero-sum game in order to play the game, the credit account facility being operable to credit the credit account of any player who has purchased credit through the credit dispensing means with an amount equivalent to the credit purchased by that player.

Yet further features of the invention provide for the clearing account facility to be controllable by the discrimination means to debit the clearing account of a portal associated with each player who has made an unsuccessful wager on the turn of an instance of the game by an amount equivalent to the magnitude of that player's wager, for the administration facility to withhold a portion of the total of all the wagers on the turn of the instance of the game as a rake, and for the clearing account facility to be controllable by the discrimination means to credit the clearing account of a portal associated with a player who has made a successful wager on the turn of the instance of the game by an amount equivalent to the total of all the unsuccessful wagers in that turn, less the rake.

There is further provided for the credit account facility of a portal to debit the credit account of any player who has made a wager on the turn of the instance of the game by an amount equivalent to the magnitude of the wager, and for the credit account facility to credit the credit account of a player who has made a successful wager on the turn of the instance of the game by an amount equivalent to the total of all the wagers inclusive of the successful wager, less the rake.

There is still further provided for the clearing account facility to adjust the individual clearing account balances of the portals only after a plurality of turns of the instance of the zero-sum game as a function of the outcomes of the plurality of turns, for each clearing account balance to have a corresponding minimum threshold, for the administration facility to suspend from further participation in any instance of the zero-sum game all players whose associated portal has a clearing account balance that is less than its respective minimum threshold, and for at least a portion of the rake in the turn of the instance of the game to be credited to the clearing accounts of each portal as a function of a proportion of players participating in the turn through that portal.

There is yet further provided for the communication network to be an open communication network, preferably the Internet, for each portal to be a website on the World Wide Web of the Internet, preferably an on-line casino website, alternatively a poker room website, for the user access facility to be a computer workstation connectable to the World Wide Web of the Internet, for the rake withheld from the total of all the wagers on each turn of the game to be zero, and for the multiplayer zero-sum game to be a game of multiplayer poker.

The invention extends to a server system for playing a multiplayer zero-sum game, comprising:

a gaming server operable under program control to regulate the progress of at least one instance of the zero-sum game in which a predetermined plurality of players can participate, the gaming server being communicable with a number of portals by means of a communication network and accessible by any one of the plurality of players through a selectable one of the number of portals;

a register of players participating in the at least one instance of the game, the register including, for each participating player, data representative of a corresponding portal through which the player accessed the gaming server; and discrimination means responsive to progress of the at least one instance of the zero-sum game to determine whether a wager placed thereon by any one of the participating players is successful or unsuccessful.

There is further provided for the gaming server to be operable under program control to initiate a further instance of the zero-sum game when all previous instances of the game have the predetermined plurality of participating players, for the system to include an administration facility operable to legislate access at any time to any instance of the game by any would-be player requesting participation in the game, as a function of a number of players currently participating in that instance of the game, and for the register to include data corresponding to each participating player in every instance of the game, the data being representative of an instance of the game in which that player is participating, and representative of a corresponding portal through which that player accessed the gaming server.

There is still further provided for the server system to include a clearing account facility having a clearing account corresponding to each one of the number of portals, for each portal to include a sub-register of players participating in any instance of the zero-sum game through that portal, for each portal to have a corresponding credit account facility having a credit account corresponding to each player in its sub-register of players, and for the server system to include credit dispensing means capable of dispensing purchased credit to any player participating in any instance of the zero-sum game in order to play the game, the credit account facility being operable to credit the credit account of any player who has purchased credit through the credit dispensing means with an amount equivalent to the credit purchased by that player.

There is yet further provided for the clearing account facility to be controllable by the discrimination means to debit the clearing account of a portal associated with each player who has made an unsuccessful wager on the turn of an instance of the game by an amount equivalent to the magnitude of that player's wager, for the administration facility to withhold a portion of the total of all the wagers on the turn of the instance of the game as a rake, and for the clearing account facility to be controllable by the discrimination means to credit the clearing account of a portal associated with a player who has made a successful wager on the turn of the instance of the game by an amount equivalent to the total of all the unsuccessful wagers in that turn, less the rake.

There is also provided for the credit account facility of each portal to debit the credit account of any player who has made a wager on the turn of the instance of the game through that portal, by an amount equivalent to the magnitude of the wager, and for the credit account facility of each portal to credit the credit account of any player who has made a successful wager on the turn of the instance of the game through that portal by an amount equivalent to the total of all the wagers inclusive of the successful wager, less the rake.

There is further provided for the clearing account facility to adjust the individual clearing account balances of the portals only after a plurality of turns of the any instance of the zero-sum game as a function of the outcomes of the plurality of turns, for each clearing account balance to have a corresponding minimum threshold, for the administration facility to suspend from further participation in any instance of the zero-sum game all players whose associated portal has a clearing account balance that is less than its respective minimum threshold, for at least a portion of the rake in the turn of the instance of the game to be credited to the clearing accounts of each portal as a function of a proportion of players participating in the turn through that portal, for the rake withheld from the total of all the wagers on each turn of the game to be zero, and for the multiplayer zero-sum game to be a game of multiplayer poker.

The invention extends still further to a method of operation of a system for playing a zero-sum game, comprising the steps of:

controlling a gaming server operable under program control to regulate the progress of at least one instance of the zero-sum game, the gaming server enabling participation in the at least one instance of the zero-sum game by a predetermined plurality of players;

providing a number of portals communicable with the gaming server by means of a communication network;

establishing access to the gaming server for each player along the communication network through a corresponding one of the number of portals;

maintaining a register of players participating in the at least one instance of the game, the register including, for each participating player, data representative of the corresponding portal through which the player accessed the gaming server;

accepting a wager from any participating player on the at least one instance of the zero-sum game; and determining whether a wager placed by any one of the participating players is successful or unsuccessful in response to progress of the at least one instance of the zero-sum game.

There is also provided for controlling the gaming server to initiate a further instance of the zero-sum game when all prior instances of the game have the predetermined plurality of participating players, for legislating access at any time to any instance of the game by any would-be player requesting participation in the game, as a function of a number of players participating in that instance of the game, for enabling participation in any instance of the game by players requesting participation in the game through any one of the number of portals, and for including in the register data corresponding to each participating player in every instance of the game, the data being representative of an instance of the game in which that player is participating, and representative of a corresponding portal through which that player accessed the gaming server.

There is also provided for maintaining a clearing account corresponding to each one of the number of portals, for establishing a sub-register corresponding to each portal, the sub-register containing details of players participating in any instance of the zero-sum game through that portal, for maintaining a credit account corresponding to each player included in the sub-register of players, and for dispensing purchased credit to any player participating in any instance of the zero-sum game in order to play the game and crediting the credit account of any player who has purchased credit by an amount equivalent to the credit purchased by that player.

There is also provided for debiting the clearing account of a portal associated with each player who has made an unsuccessful wager on the turn of an instance of the game by an amount equivalent to the magnitude of that player's wager, for withholding a portion of the total of all the wagers on the turn of the instance of the game as a rake, and for crediting the clearing account of a portal associated with a player who has made a successful wager on the turn of the instance of the game by an amount equivalent to the total of all the unsuccessful wagers in that turn, less the rake.

There is also provided for debiting the credit account of any player who has made a wager on the turn of the instance of the game by an amount equivalent to the magnitude of the wager, and for crediting the credit account of a player who has made a successful wager on the turn of the instance of the game by an amount equivalent to the total of all the wagers inclusive of the successful wager, less the rake.

There is also provided for adjusting the individual clearing account balances of the portals only after a plurality of turns of any instance of the zero-sum game as a function of the outcomes of the plurality of turns, for determining a corresponding minimum threshold associated with each clearing account balance, for suspending from further participation in any instance of the zero-sum game all players whose associated portal has a clearing account balance that is less than its respective minimum threshold, and for crediting at least a portion of the rake in the turn of the instance of the game to the clearing accounts of each portal as a function of a proportion of players participating in the turn through that portal, for setting the rake withheld from the total of all the wagers on each turn of the game to be zero, and for the zero-sum game to be a game of multiplayer poker.

The invention extends yet further to a method of operation of a server system for playing a multiplayer zero-sum game, comprising the steps of:

controlling a gaming server to regulate the progress of at least one instance of the zero-sum game, the gaming server enabling participation in the at least one instance of the zero-sum game by a predetermined plurality of players;

providing a number of portals communicable with the gaming server by means of a communication network;

establishing access to the gaming server along the communication network through a corresponding one of the number of portals;

maintaining a register of players participating in the at least one instance of the game, the register including, for each participating player, data representative of a corresponding portal through which the player accessed the gaming server;

accepting a wager from any participating player on the at least one instance of the zero-sum game; and determining whether a wager placed by any one of the participating players is successful or unsuccessful in response to progress of the at least one instance of the zero-sum game.

There is also provided for initiating a further instance of the zero-sum game when all the prior instances of the game have the predetermined plurality of participating players, for legislating access at any time to any instance of the game by any would-be player requesting participation in the game, as a function of a number of players participating in that instance of the game, for enabling participation in any instance of the game by players requesting participation in the game through any one of the number of portals, and for including in the register data corresponding to each participating player in every instance of the game, the data being representative of an instance of the game in which that player is participating, and representative of a corresponding portal through which that player accessed the gaming server.

There is also provided for maintaining a clearing account corresponding to each one of the number of portals, for establishing a sub-register corresponding to each portal, the sub-register containing details of players participating in any instance of the zero-sum game through that portal, for maintaining a credit account corresponding to each player included in the sub-register of players, and for dispensing purchased credit to any player participating in any instance of the zero-sum game in order to play the game, and crediting the credit account of any player who has purchased credit by an amount equivalent to the credit purchased by that player.

There is also provided for debiting the clearing account of a portal associated with each player who has made an unsuccessful wager on the turn of an instance of the game by an amount equivalent to the magnitude of that player's wager, for withholding a portion of the total of all the wagers on the turn of the instance of the game as a rake, and for crediting the clearing account of a portal associated with a player who has made a successful wager on the turn of the instance of the game by an amount equivalent to the total of all the unsuccessful wagers in that turn, less the rake.

There is also provided for debiting the credit account of any player who has made a wager on the turn of the instance of the game by an amount equivalent to the magnitude of the wager, and for crediting the credit account of any player who has made a successful wager on the turn of the instance of the game by an amount equivalent to the total of all the wagers inclusive of the successful wager, less the rake.

There is also provided for adjusting the individual clearing account balances of the portals only after a plurality of turns of any instance of the zero-sum game as a function of the outcomes of the plurality of turns, for determining a corresponding minimum threshold associated with each clearing account balance, for suspending from further participation in any instance of the zero-sum game all players whose associated portal has a clearing account balance that is less than its respective minimum threshold, for crediting at least a portion of the rake in the turn of the instance of the game to the clearing accounts of each portal as a function of a proportion of players participating in the turn through that portal, for setting the rake withheld from the total of all the wagers on each turn of the game to be zero, and for the zero-sum game to be a game of multiplayer poker.

BRIEF DESCRIPTION OF THE DRAWINGS

A preferred embodiment of the invention is described below, by way of example only, and with reference to the abovementioned drawings, in which.

DETAILED DESCRIPTION OF THE INVENTION

This embodiment of the invention will be described with particular reference to a system for playing a game of multiplayer poker. It is to be clearly understood, however, that the scope of the invention is not limited to this particular application.

Figure 1:
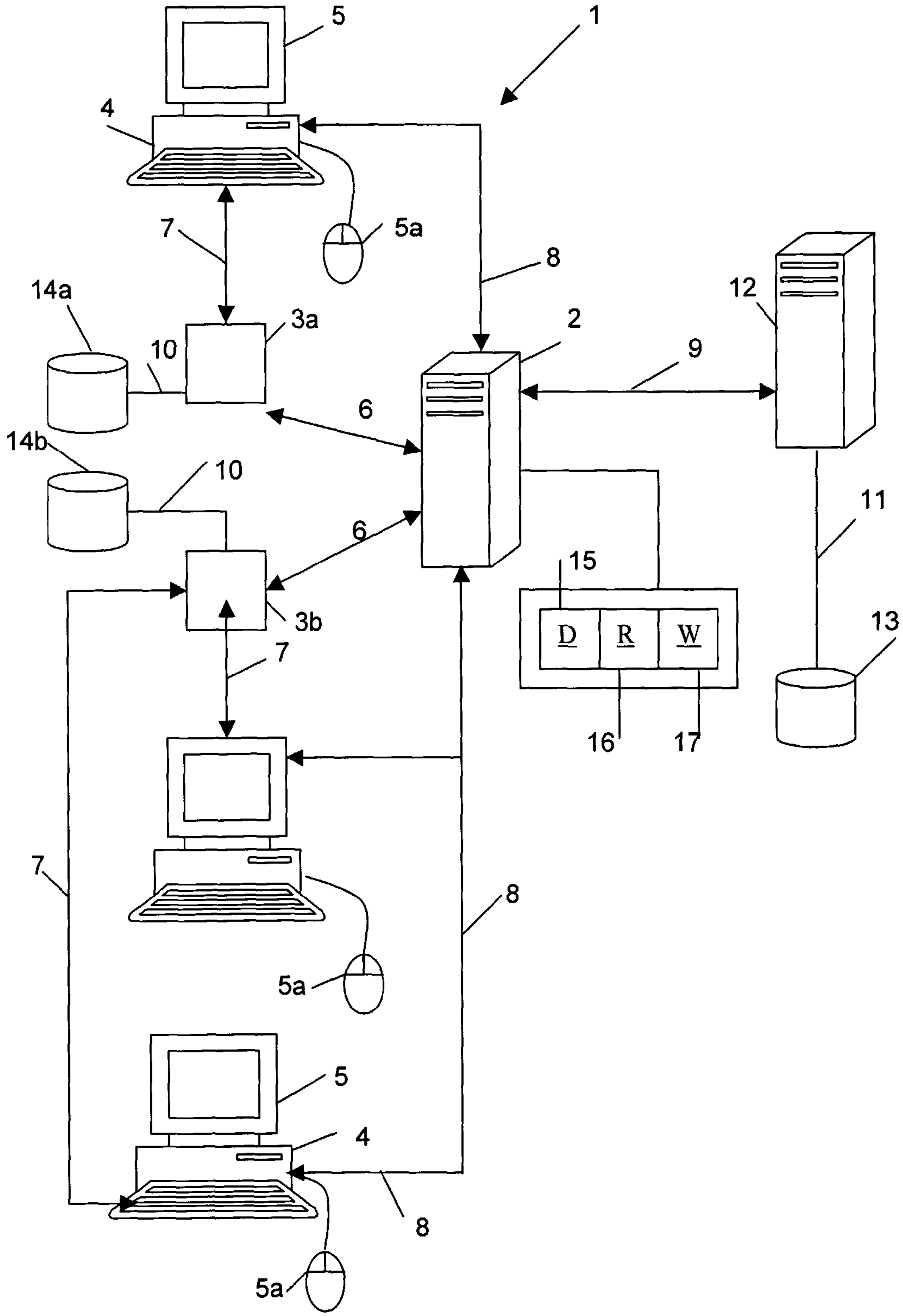
FIG. 1 is a schematic representation of a system for playing a multiplayer zero-sum game.

Referring to FIG. 1, a system for playing a game of multiplayer poker is indicated generally by reference numeral (1). The system (1) includes a gaming server (2), and a number of portals (3*a*, 3*b*) in the form of portal websites on the World Wide Web of the Internet. In this embodiment each one of the portal websites is an online casino website hosted on a corresponding casino web server (not shown). For convenience, this particular embodiment of the invention will be described with particular reference to only two such online casino websites (3*a*, 3*b*). Each one of the online casino websites (3*a*, 3*b*) is accessible by a would-be poker player (not shown) through a user access facility (4) in the form of an Internet-enabled computer workstation having a display (5) and an associated pointing device (5*a*), such as a mouse or, alternatively, a touchpad. In this embodiment, online casino website (3*a*) is shown as having one computer workstation (4) logically connected thereto, whereas casino website (3*b*) is shown as being logically connected to two computer workstations (4). It will be appreciated by those skilled in the art that such an online casino websites (3*a*, 3*b*) can be logically connected to any desired number of such computer workstations (4) simultaneously, which number is physically limited only by considerations of processing power and Internet access bandwidth.

The system (1) includes, further, an administration facility (12) in the form of an application web server, which is communicable with the gaming server (2) along a communication network (9). The detailed operation of the application web server (12) will be outlined in the description that follows.

The gaming server (2), the online casino web servers (not shown) corresponding to the online casino websites (3*a*, 3*b*), the computer workstations (4) and the application web server (12) are capable of communicating with each other by means of an open communication network that is, in this embodiment, the World Wide Web of the Internet. Although the World Wide Web of the Internet is a single packet-switched communication network, it is represented in FIG. 1 as separate logical communication networks (6,7,8,9, 10 and 11).

The application web server (12) provides a clearing account facility (13) that has a clearing account corresponding to each one of the online casino websites (3*a*, 3*b*). Analogously, each online casino websites (3*a*, 3*b*) includes a corresponding credit account facility (14*a*, 14*b*) with a credit account corresponding to each player who participates in the game of poker through a computer workstation (4) logically connected to that casino website. In the illustrated embodiment, therefore, the credit account facility (14*a*) has one player credit account associated with it, while credit account facility (14*b*) has two associated player credit accounts.

The gaming server (2) operates under control of a server stored program (not shown) capable of enabling a predetermined maximum number, say 8, of players to play an instance of the game of multiplayer poker. When the number of players reaches this predetermined maximum number, the server stored program causes a further instance of the game to be initiated, the new instance of the game also being capable of accommodating a further 8 players. In this manner the gaming server is capable, under server stored program control, to spawn as many separate instances of the game of multiplayer poker as required in order to accommodate a pool of players who desire to play the game, in groups of a maximum of 8. Each instance of the game spawned in this manner is treated as totally independent of the other instances.

The online casino websites (3*a*, 3*b*) enable a player who desires to join the game of multiplayer poker to request, by means of one of the computer workstations (4), participation in the game and, once admitted to an instance of the game, to place a wager on a turn of that instance of the game. Each participating player is presented with an identical graphical user interface (GUI) on his respective computer workstation (4) by a separate workstation stored program in the workstation. The GUI presents to the player a suitable display of a poker game (not shown) with appropriate activatable icons that enable the player to make his own desired game play decisions and to monitor the progress of the multiplayer game by viewing the game play decisions of the other participating players in the same instance of the game.

The server-stored program also provides a wagering means (17) operable by any participating player to place a wager on a turn of the game, as well as a discrimination means (15) capable of determining whether any wager placed by any one of the participating players on the turn of the instance of the game of multiplayer poker is successful or unsuccessful. The stored program in the gaming server (2) also maintains a dynamic register (16) of all players admitted to, and actively participating in, all the spawned instances of the poker game from time to time, together with data representative of a corresponding portal (3*a*, 3*b*) through which each participating player accessed the game. The dynamic register (16) also contains data representative of an instance of the game in which the player is participating. The application web server (12) also settles the wagers of the participating players after the completion of every turn of any instance of the game.

Each computer workstation (4) is a conventional personal computer operating under a Windows 2000 operating system, which is well known and commercially available from the Microsoft Corporation of Seattle, Wash., USA. The gaming server (2) also operates under the Windows 2000 operating system. The zero-sum game of multiplayer poker consists of a workstation-stored program (not shown) referred to, for convenience, as a client process that is executable on a computer workstation (4), and a corresponding server-stored program (not shown), or server process, that is executable on the gaming server (2). The server process (not shown) generates one or more random events that affect the outcome of the zero-sum game of poker, such as the dealing of cards to participating players. The client process (not shown) obtains the result of the random events from the gaming server (2), across the communication network (4) and displays the outcome of the game on the display monitor (5) in an intelligible manner. In order to play the zero-sum game of multiplayer poker from any computer workstation (4), the client process (not shown) must first be downloaded from the gaming server (2) to that computer workstation.

Figure 2:
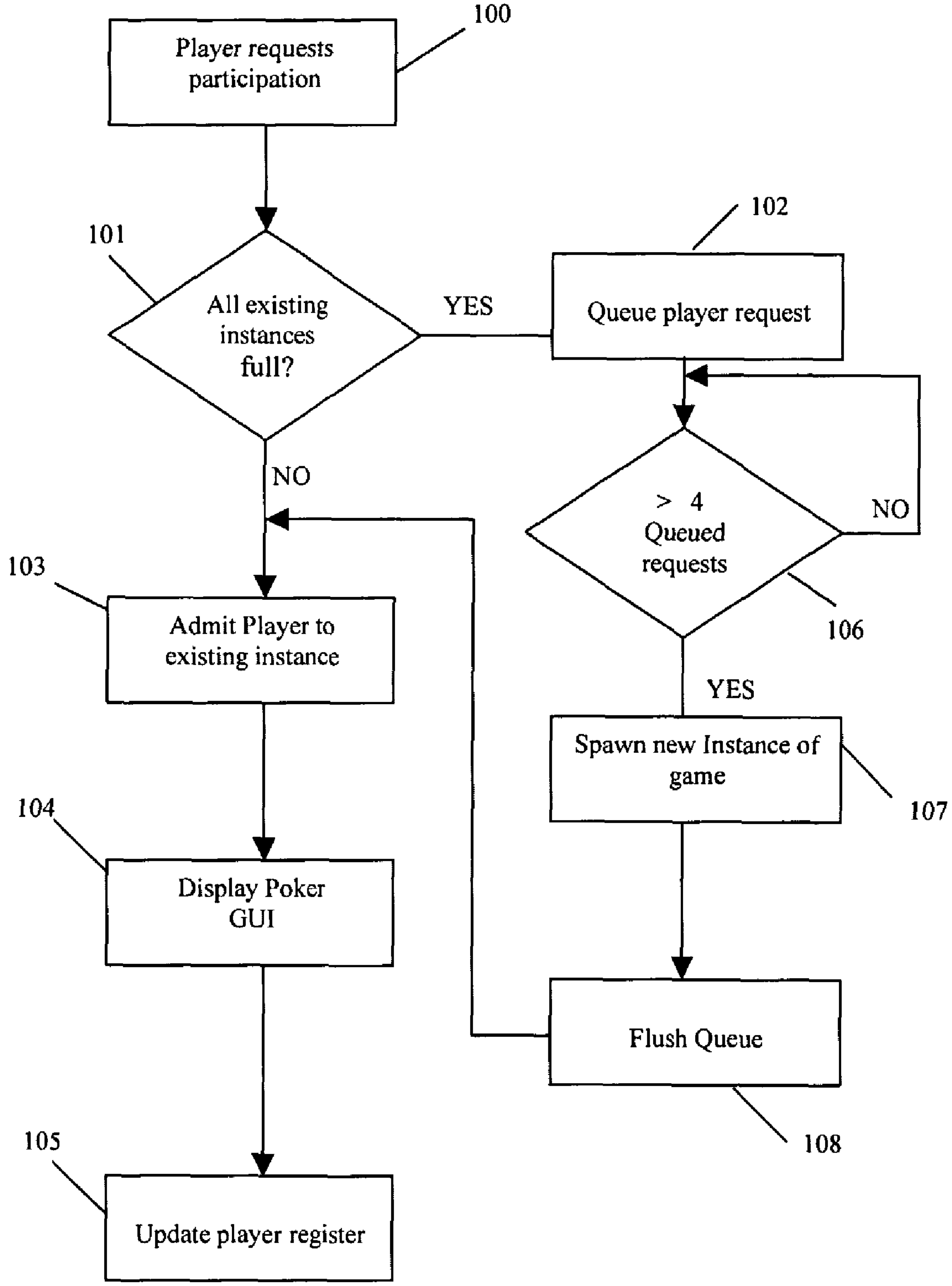
FIG. 2 is a flow diagram of the steps required for a player to participate in the game of FIG. 1.

In use, a player wishing to participate in the game of poker uses a computer workstation (4) to access an online casino website (3*a*, 3*b*) of his choice. A flow diagram outlining the steps required in order for a player to participate in an instance of the game is indicated in FIG. 2. The player is presented with an icon (not shown) on the GUI on his computer workstation (4), which the user can activate in order to request participation in the poker game. The user's request for participation (100) is passed by the online casino website (3*a*, 3*b*) to the gaming server (2), which adjudicates and processes the request in the following manner 1. if all existing instances of the poker game are currently being played by 8 players, the existing instances of the game are all fully occupied and the would-be player cannot be admitted to any instance of the game (101). The user is notified of the situation and prompted to join a waiting list of would-be players (102);
2. if any one of the existing instances of the poker game does have a vacancy, the would-be player is admitted to that instance of the game (103) or if previously on the waiting list, is removed therefrom and admitted to that instance of the game. An appropriate multiplayer poker GUI is presented to the newly-admitted player (at 104) to allow him to play the game and to place wagers thereon;
3. the register of active participating players is updated (at 105) to include the details of the newly-admitted player, together with data representative of the online casino from which the player was admitted to the game, as well as the particular instance of the game to which he has been admitted;
4. when the waiting list of would-be players has grown sufficiently large, say 4 or 5 would-be players (106), the gaming server spawns a new instance of the game (107) to accommodate the would-be players in the waiting list, and the list is flushed (108); and 5. the register of active participating players is updated (105) to include the details of all the newly-admitted players in the newly-spawned instance of the game, together with data representative of the online casino from which the players were admitted to the instance of the game, as well as the particular instance of the game to which the players have been admitted.

Figure 3:
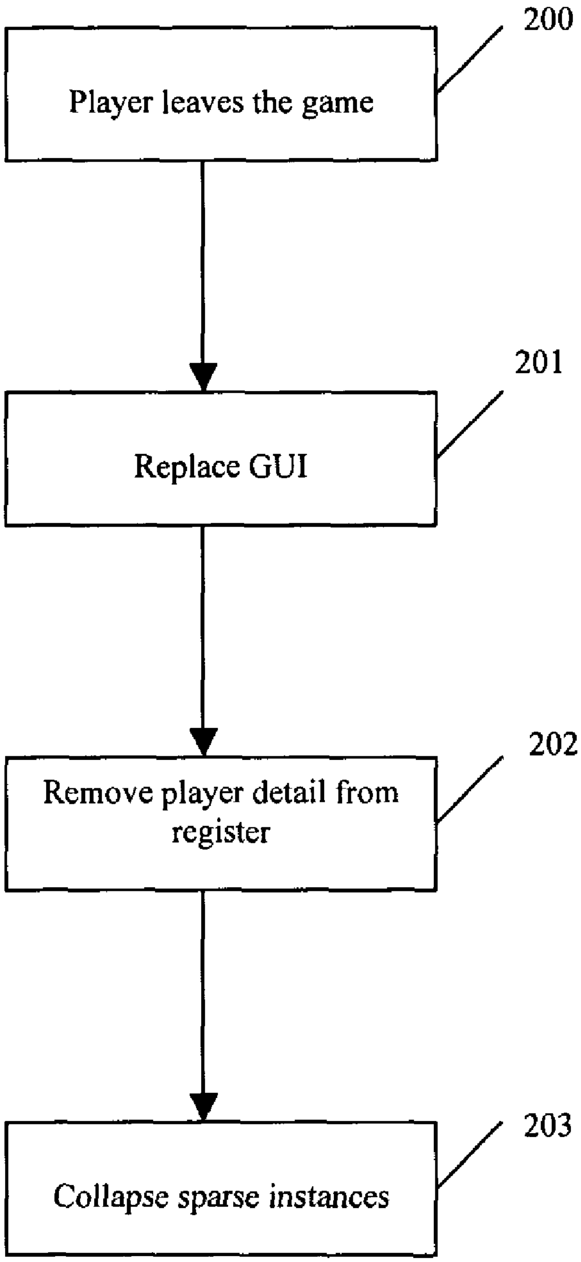
FIG. 3 is a flow diagram of the steps required for a participating player to leave an instance of the game of FIG. 1.

Any player is able to leave the instance of the poker game in which he is participating at any time upon completion of a turn of that instance of the game. A flow diagram outlining the steps required for a player to leave an existing instance of the game is outlined in FIG. 3. When a participating player leaves an instance of the poker game (200), the player's departure results in the system (1) undertaking the following actions:

1. the GUI corresponding to the poker game on the computer workstation is replaced by one allowing the player to select another casino game to play (201);
2. the departing player's details are removed from the register of active participating players (202); and
3. the remaining instances of the game are analysed in order to collapse any sparsely populated instances of the game and to consolidate the participating players in these instances into a single more densely-populated instance of the game (203).

Figure 4:
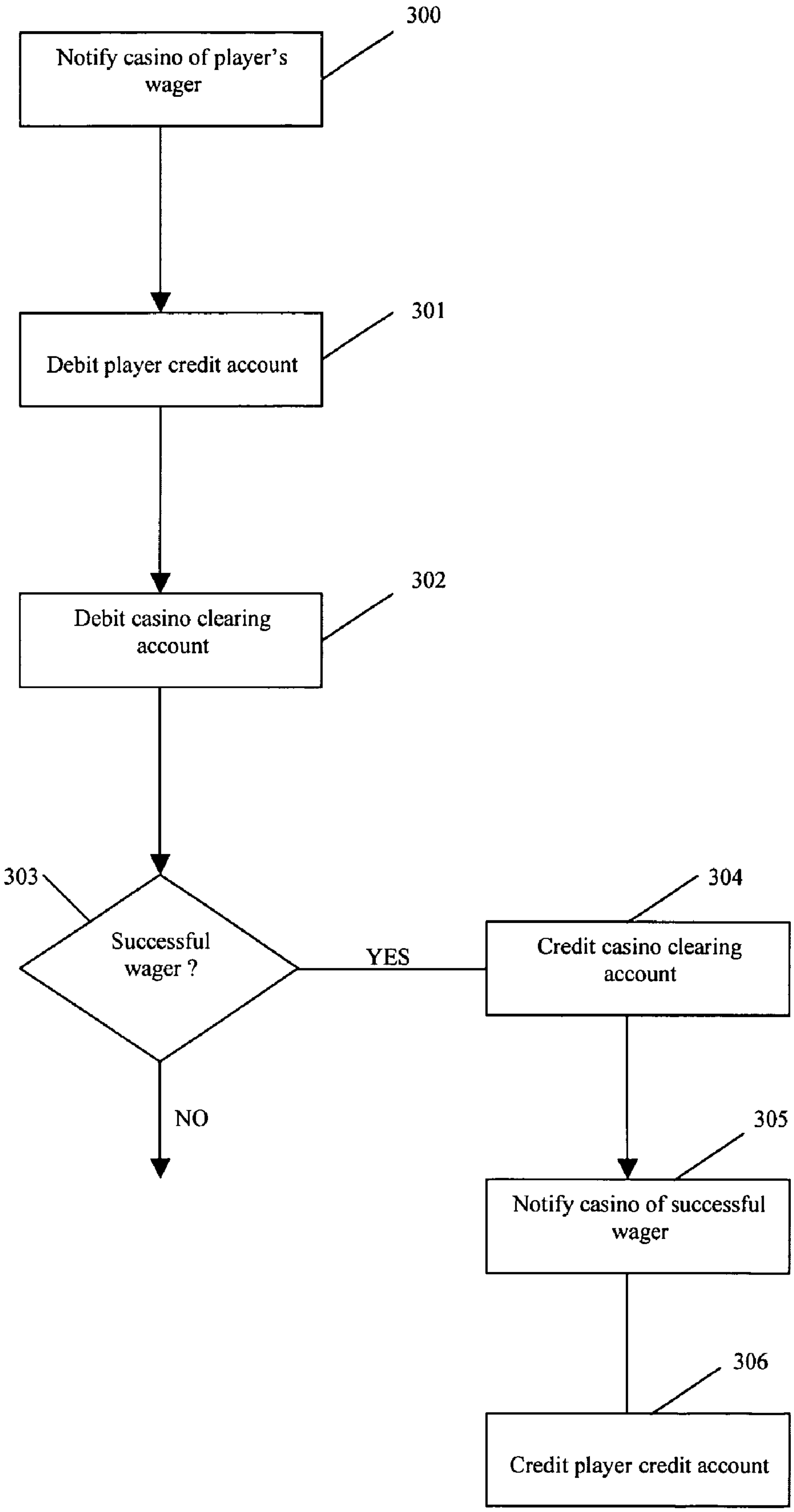
FIG. 4 is a flow diagram of the steps required to settle wagers placed by players participating in the multiplayer zero-sum game of FIG. 1.

The participating players in any instance of the game utilise the wagering means (17) to place wagers from time to time on a turn of the poker game and effect playing decisions required during the progress of the turn, as described above. Once the turn of the game has been completed, the discrimination means (15) determines which of the players is the winner of the turn and the application web server (12) settles the wagers placed by the participating players on that turn of the instance of game, as follows, as indicated in FIG. 4:

1. the gaming server (2) notifies an online casino website (3*a*, 3*b*) associated with each player who has made a wager on the turn of the game (300). Each of the online casino websites (3*a*, 3*b*) then debits the individual credit account of its associated player by an amount equivalent to the magnitude of that player's wager (301);
2. the clearing account of an online casino website (3*a*, 3*b*) associated with each player who has made a wager on the turn of the game is then debited by an amount equivalent to the magnitude of that player's corresponding wager (302);
3. the clearing account of an online casino website (3*a*, 3*b*) associated with the player who has made the successful wager (303) on the turn of the game is credited by an amount equivalent to the total of all the wagers inclusive of the successful wager (304); and
4. the gaming server (2) also notifies the online casino website (3*a*, 3*b*) associated with the successful player (305) and that online casino website credits the individual credit account of the successful player by an amount equivalent to the total of all the wagers inclusive of the successful wager (306).

It is anticipated that the wagers placed by the participating players in the game will be made with credit purchased by such players prior to their participation in the game. For this purpose each online casino (3*a*, 3*b*) includes credit-dispensing means (not shown) capable of dispensing credit to any player who wishes to participate in the poker game. The player may purchase credit by means of conventional credit or debit card payment facilities that are well known in the art and which will not be described here in detail. Whenever a player purchases credit from the credit dispensing means, the corresponding online casino (3*a*, 3*b*) credits that player's credit account with an amount equivalent to the quantity of credit purchased by the player.

The above embodiment of the invention does not provide any compensation for an operator of the gaming server who provides the participating players with a facility to play the poker game, or for the online casino websites (3*a*, 3*b*) that make their players available to the gaming server (2) for establishment of the poker game. In a variation of the above embodiment, the application server withholds a portion of the total of all the wagers on each turn of the game as a rake for the benefit of the operator of the gaming server (2) and the online casino websites (3*a*, 3*b*). A portion of the rake is credited to the clearing account of each online casino (3*a*, 3*b*) as a function of the proportion of players participating in the turn of the instance of the game through that particular casino website. In this variation of the embodiment, the clearing account of the casino (3*a*, 3*b*) associated with the player who has made a successful wager on the turn of the game is credited with an amount equivalent to the total of all the wagers inclusive of the successful wager, less the amount of the rake. Analogously, the credit account of the player who has made the successful wager is credited by an amount equivalent to the total all the wagers inclusive of the successful wager, less the rake.

It will be appreciated by those skilled in the art that the system (1) provides a facility for pooling players from different online casino websites (3*a*, 3*b*) to enable them to participate in the game of poker. Prior art systems which enable players to play multi-player games such as poker operate within the context of a single online casino and establish these games by utilising players from that casino only. This has undesirable consequences as the pool of potential players is limited to clients of that particular casino, and a considerable time may be required for a sufficient number of players to be gathered before a game can get underway, leading to player frustration and a high player attrition rate. The present invention establishes a game with players drawn from a multiplicity of different online casinos, that is, from a larger pool of potential players, leading to the establishment of a poker game in a reduced time. Further, an established instance of a poker according to the invention is likely to last longer than a game established under a prior art system, as there is a larger pool of available players from which replacements can be drawn to replace participating players who leave the instance of the game.

It will be further appreciated by those skilled in the art that such an arrangement where players from several online casino websites (3*a*, 3*b*) are pooled for the purpose of establishing a game, requires the use of a clearing account facility to manage and process the flow of credit between the various online casinos from which the pool of players are drawn.

Numerous modifications are possible to this invention without departing from the scope of the invention. In particular, the system may be applied to any multiplayer zero-sum game on which participating players may place wagers. Further examples of such games are backgammon, bridge, gin rummy, canasta, whist or mah-jong. Further, the application web server (12) can be arranged to monitor the individual credit account balances of the participating players at the on-line casino websites (3*a* and 3*b*) and to cause the gaming server (2) to terminate participation in the game of any player whose credit account balance drops below a predetermined minimum threshold. Still further, the administration facility may also require each clearing account associated with an on-line casino website to exceed a prescribed minimum balance at all times, and for the administration facility (12) to terminate participation in the game of all players who have accessed the game through an online casino website whose associated account balance falls below the prescribed minimum balance. Yet further, the credit dispensing means (not shown) may be a centralised credit dispensing means, instead of a distributed one available through each online casino website (3*a*, 3*b*). Finally, a portal need not be an online casino website where a variety of different games are offered to a player, but rather a poker room where poker is the only game available to would-be players.

The technical problem solved by this invention is to enable implementation of distributed multiplayer zero-sum games, such as those listed above, drawing and pooling players from different, possibly competing, entities such as online casinos or other groups such as sports betting organisations and the like. The invention performs dynamic load management by spawning new instances of the multiplayer game and collapsing and merging sparsely populated instances of the game to accommodate changing levels of player demand. The invention also solves a technical problem of inter-entity transaction settlement by means of a clearing account facility and a separate clearing account corresponding to each entity from which participating players are drawn. Individual player transaction settlement is solved by means of a tier of individual player accounts, one for each participating player.

The invention therefore provides a novel system and method for establishing and administering an online multiplayer zero-sum game from a pool of would-be players drawn from several different on-line casinos.

The invention claimed is:

1. A system for playing a multiplayer zero-sum game, comprising:

- a gaming server operable under program control to regulate the progress of at least one instance of the multiplayer zero-sum game, the gaming server enabling participation in the at least one instance of the multiplayer zero-sum game by a predetermined plurality of players;
- a plurality of portals associated with a plurality of competing game provider entities, each portal being communicable with the gaming server by means of a communication network;
- a clearing account facility having a separate clearing account for each game provider entity;
- a user access facility corresponding to each player, each user access facility being operable by a player to access the gaming server for participation in the at least one instance of the multiplayer zero-sum game along the communication network through a selectable one of the plurality of portals, wherein each portal can be logically connected to a plurality of user access facilities simultaneously;
- a register of players currently participating in the at least one instance of the multiplayer zero-sum game, the register including, for each currently participating player, data representative of a corresponding portal through which the player accessed the gaming server;
- a wagering means operable by each player to place a wager on the at least one instance of the multiplayer zero-sum game; and
- discrimination means responsive to progress of the at least one instance of the multiplayer zero-sum game to determine whether a wager placed thereon by any one of the participating players is successful or unsuccessful.

2. A system as claimed in claim 1 in which the gaming server is operable under program control to initiate a further instance of the multiplayer zero-sum game when all prior instances of the multiplayer zero-sum game have the predetermined plurality of participating players.

3. A system as claimed in claim 2 which includes an administration facility operable to legislate access at any time to any instance of the multiplayer zero-sum game by any would-be player requesting participation in the multiplayer zero-sum game, as a function of a number of players currently participating in that instance of the multiplayer zero-sum game.

4. A system as claimed in claim 3 in which the administration facility enables participation in any instance of the multiplayer zero-sum game by players requesting participation through any one of the plurality of portals.

5. A system as claimed in claim 4 in which the register includes data corresponding to each participating player in every instance of the multiplayer zero-sum game, the data being representative of an instance of the multiplayer zero-sum game in which that player is participating, and representative of a corresponding portal through which that player accessed the gaming server.

6. A system as claimed in claim 1 in which each portal includes a corresponding sub-register of players participating in any instance of the multiplayer zero-sum game through that portal.

7. A system as claimed in claim 6 in which each portal has a corresponding credit account facility having a credit account corresponding to each player in its sub-register of players.

8. A system as claimed in claim 7 that includes credit-dispensing means capable of dispensing purchased credit to any player participating in any instance of the multiplayer zero-sum game in order to play the multiplayer zero-sum game, the credit account facility being operable to credit the credit account of any player who has purchased credit through the credit dispensing means with an amount equivalent to the credit purchased by that player.

9. A system as claimed in claim 7 in which the clearing account facility is controllable by the discrimination means to debit each entity's clearing account for each player accessing that entity's portal who has made an unsuccessful wager on the turn of an instance of the multiplayer zero-sum game by an amount equivalent to the magnitude of that player's wager.

10. A system as claimed in claim 9 in which the administration facility withholds a portion of the total of all the wagers on the turn of the instance of the multiplayer zero-sum game as a rake.

11. A system as claimed in claim 10 in which the clearing account facility is controllable by the discrimination means to credit an entity's clearing account associated with a player who has made a successful wager on the turn of the instance of the multiplayer zero-sum game by an amount equivalent to the total of all the unsuccessful wagers in that turn, less the rake.

12. A system as claimed in claim 11 in which the credit account facility of each portal debits the credit account of any player who has made a wager on the turn of the instance of the multiplayer zero-sum game through that portal by an amount equivalent to the magnitude of the wager.

13. A system as claimed in claim 12 in which the credit account facility of each portal credits the credit account of any player who has made a successful wager on the turn of the instance of the multiplayer zero-sum game through that portal by an amount equivalent to the total of all the wagers inclusive of the successful wager, less the rake.

14. A system as claimed in claim 10 in which at least a portion of the rake in the turn of the instance of the multiplayer zero-sum game is credited to each entity's clearing account as a function of a proportion of players participating in the turn through a portal of that entity.

15. A system as claimed in claim 10 in which the rake withheld from the total of all the wagers on each turn of the multiplayer zero-sum game is zero.

16. A system as claimed in claim 9 in which the clearing account facility adjusts the balance of each clearing account only after a plurality of turns of the instance of the multiplayer zero-sum game as a function of outcomes of the plurality of turns.

17. A system as claimed in claim 1 in which each entity's clearing account has a corresponding minimum threshold balance.

18. A system as claimed in claim 17 in which the administration facility suspends from further participation in any instance of the multiplayer zero-sum game all players accessing a portal of an entity having a clearing account balance that is less than its respective minimum threshold.

19. A system as claimed in claim 1 in which the communication network is an open communication network.

20. A system as claimed in claim 19 in which the open communication network is the Internet.

21. A system as claimed in claim 20 in which each portal is a website on the World Wide Web of the Internet.

22. A system as claimed in claim 21 in which the website is an on-line casino website.

23. A system as claimed in claim 21 in which the website is a poker room website.

24. A system as claimed in claim 21 in which the user access facility is a computer workstation connectable to the World Wide Web of the Internet.

25. A system as claimed in claim 1 in which the multiplayer zero-sum game is a game of multiplayer poker.

26. A server system for a multiplayer zero-sum game, comprising:

a gaming server operable under program control to regulate the progress of at least one instance of the multiplayer zero-sum game in which a predetermined plurality of players can participate, the gaming server being communicable with a plurality of portals associated with a plurality of competing game provider entities, by means of a communication network, and accessible by any one of the plurality of players through a selectable one of the plurality of portals;

a clearing account facility having a separate clearing account for each game provider entity;

a register of players currently participating in the at least one instance of the multiplayer zero-sum game, the register including, for each currently participating player, data representative of a corresponding portal through which the player accessed the gaming server; and discrimination means responsive to progress of the at least one instance of the multiplayer zero-sum game to determine whether a wager placed thereon by any one of the participating players is successful or unsuccessful.

27. A server system as claimed in claim 26 in which the gaming server is operable under program control to initiate a further instance of the multiplayer zero-sum game when all prior instances of the multiplayer zero-sum game have the predetermined plurality of participating players.

28. A server system as claimed in claim 27 that includes an administration facility to be operable to legislate access at any time to any instance of the multiplayer zero-sum game by any would-be player requesting participation in the multiplayer zero-sum game, as a function of a number of players currently participating in that instance of the multiplayer zero-sum game.

29. A server system as claimed in claim 28 in which the administration facility enables participation in any instance of the multiplayer zero-sum game by players requesting participation through any one of the plurality of portals.

30. A server system as claimed in claim 29 in which the register includes data corresponding to each participating player in every instance of the multiplayer zero-sum game, the data being representative of an instance of the multiplayer zero-sum game in which that player is participating, and representative of a corresponding portal through which that player accessed the gaming server.

31. A server system as claimed in claim 26 in which each portal includes a sub-register of players participating in any instance of the multiplayer zero-sum game through that portal.

32. A server system as claimed in claim 31 in which each portal has a corresponding credit account facility having a credit account corresponding to each player in its sub-register of players.

33. A server system as claimed in claim 32 that includes credit-dispensing means capable of dispensing purchased credit to any player participating in any instance of the multiplayer zero-sum game in order to play the multiplayer zero-sum game, the credit account facility being operable to credit the credit account of any player who has purchased credit through the credit dispensing means with an amount equivalent to the credit purchased by that player.

34. A server system as claimed in claim 32 in which the clearing account facility is controllable by the discrimination means to debit each entity's clearing account for each player accessing that entity's portal who has made an unsuccessful wager on the turn of an instance of the multiplayer zero-sum game by an amount equivalent to the magnitude of that player's wager.

35. A server system as claimed in claim 34 in which the administration facility withholds a portion of the total of all the wagers on the turn of the instance of the multiplayer zero-sum game as a rake.

36. A server system as claimed in claim 35 in which the clearing account facility is controllable by the discrimination means to credit an entity's clearing account associated with a player who has made a successful wager on the turn of the instance of the multiplayer zero-sum game by an amount equivalent to the total of all the unsuccessful wagers in that turn, less the rake.

37. A server system as claimed in claim 36 in which the credit account facility of each portal debits the credit account of any player who has made a wager on the turn of the instance of the multiplayer zero-sum game through that portal by an amount equivalent to the magnitude of the wager.

38. A server system as claimed in claim 37 in which the credit account facility of each portal credits the credit account of any player who has made a successful wager on the turn of the instance of the multiplayer zero-sum game through that portal by an amount equivalent to the total of all the wagers inclusive of the successful wager, less the rake.

39. A server system as claimed in claim 35 in which at least a portion of the rake in the turn of the instance of the multiplayer zero-sum game is credited to each entity's clearing account as a function of a proportion of players participating in the turn through a portal of that entity.

40. A server system as claimed in claim 35 in which the rake withheld from the total of all the wagers on each turn of the multiplayer zero-sum game is zero.

41. A server system as claimed in claim 34 in which the clearing account facility adjusts the balance of each clearing account only after a plurality of turns of the instance of the multiplayer zero-sum game as a function of outcomes of the plurality of turns.

42. A server system as claimed in claim 26 in which each entity's clearing account has a corresponding minimum threshold balance.

43. A server system as claimed in claim 42 in which the administration facility suspends from further participation in any instance of the multiplayer zero-sum game all players accessing a portal of an entity having a clearing account balance that is less than its respective minimum threshold.

44. A server system as claimed in claim 26 in which the multiplayer zero-sum game is a game of multiplayer poker.

45. A method of operation of a system for playing a multiplayer zero-sum game, comprising the steps of:

- controlling a gaming server to regulate the progress of at least one instance of the multiplayer zero-sum game, the gaming server enabling participation in the at least one instance of the multiplayer zero-sum game by a predetermined plurality of players;
- establishing access to the gaming server for players participating in the at least one instance of the multiplayer zero-sum game through a plurality of portals associated with a plurality of competing game provider entities, each portal being communicable with the gaming server by means of a communication network;
- maintaining a separate clearing account for each game provider entity;
- maintaining a register of the players currently participating in the at least one instance of the multiplayer zero-sum game, the register including, for each participating player, data representative of a corresponding portal through which the player accessed the gaming server;
- accepting a wager from any participating player on the at least one instance of the multiplayer zero-sum game; and
- determining whether a wager placed by any one of the participating players is successful or unsuccessful in response to progress of the at least one instance of the multiplayer zero-sum game.

46. A method as claimed in claim 45 that includes the step of controlling the gaming server to initiate a further instance of the multiplayer zero-sum game when all prior instances of the multiplayer zero-sum game have the predetermined plurality of participating players.

47. A method as claimed in claim 46 that includes the additional step of legislating access at any time to any instance of the multiplayer zero-sum game by any would-be player requesting participation in the multiplayer zero-sum game, as a function of a number of players participating in that instance of the multiplayer zero-sum game.

48. A method as claimed in claim 47 in which participation is enabled in any instance of the multiplayer zero-sum game by players requesting participation in the multiplayer zero-sum game through any one of the plurality of portals.

49. A method as claimed in claim 48 in which data corresponding to each participating player in every instance of the multiplayer zero-sum game is included in the register, the data being representative of an instance of the multiplayer zero-sum game in which that player is participating, and representative of a corresponding portal through which that player accessed the gaming server.

50. A method as claimed in claim 45 that includes the additional step of establishing a sub-register corresponding to each portal, the sub-register containing details of players participating in any instance of the multiplayer zero-sum game through that portal.

51. A method as claimed in claim 50 in which a credit account is maintained corresponding to each player included in the sub-register of players.

52. A method as claimed in claim 51 that includes the steps of dispensing purchased credit to any player participating in any instance of the multiplayer zero-sum game in order to play the multiplayer zero-sum game, and crediting the credit account of any player who has purchased credit by an amount equivalent to the credit purchased by that player.

53. A method as claimed in claim 51, further comprising debiting each entity's clearing account for each player accessing that entity's portal who has made an unsuccessful wager on the turn of an instance of the multiplayer zero-sum game by an amount equivalent to the magnitude of that player's wager.

54. A method as claimed in claim 53 in which a portion of the total of all the wagers on the turn of the instance of the multiplayer zero-sum game is withheld as a rake.

55. A method as claimed in claim 54, further comprising crediting an entity's clearing account associated with a player who has made a successful wager on the turn of the instance of the multiplayer zero-sum game with an amount equivalent to the total of all the unsuccessful wagers in that turn, less the rake.

56. A method as claimed in claim 55 in which the credit account of any player who has made a wager on the turn of the instance of the multiplayer zero-sum game is debited by an amount equivalent to the magnitude of the wager.

57. A method as claimed in claim 56 in which the credit account of any player who has made a successful wager on the turn of the instance of the multiplayer zero-sum game is credited by an amount equivalent to the total of all the wagers inclusive of the successful wager, less the rake.

58. A method as claimed in claim 54 in which at least a portion of the rake in the turn of the instance of the multiplayer zero-sum game is credited to each entity's clearing account as a function of a portion of players participating in the turn through a portal of that entity.

59. A method as claimed in claim 54 in which the rake withheld from the total of all the wagers on each turn of the multiplayer zero-sum game is set to be zero.

60. A method as claimed in claim 53, further comprising adjusting the balance of each clearing account only after a plurality of turns of the instance of the multiplayer zero-sum game as a function of outcomes of the plurality of turns.

61. A method as claimed in claim 45 in which each entity's clearing account has a corresponding minimum threshold balance.

62. A method as claimed in claim 61 in which all players accessing a portal of an entity having a clearing account balance that is less than its respective minimum threshold are suspended from further participation in any instance of the multiplayer zero-sum game.

63. A method as claimed claim 45 in which the multiplayer zero-sum game is a game of multiplayer poker.

64. A method of operation of a server system for playing a multiplayer zero-sum game, comprising the steps of:

- controlling a gaming server to regulate the progress of at least one instance of the multiplayer zero-sum game, the gaming server enabling participation in the at least one instance of the multiplayer zero-sum game by a predetermined plurality of players;
- establishing access to the gaming server along a communication network through a plurality of portals associated with a plurality of competing game provider entities, wherein each portal can serve multiple players simultaneously;
- maintaining a separate clearing account for each game provider entity;

maintaining a register of players currently participating in the at least one instance of the multiplayer zero-sum game, the register including, for each participating player, data representative of a corresponding portal through which the player accessed the gaming server;

accepting a wager from any participating player on the at least one instance of the multiplayer zero-sum game; and determining whether a wager placed by any one of the participating players is successful or unsuccessful in response to progress of the at least one instance of the multiplayer zero-sum game.

65. A method of operation of a server system as claimed in claim 64 that includes the step of controlling the gaming server to initiate a further instance of the multiplayer zero-sum game when all the prior instances of the multiplayer zero-sum game have the predetermined plurality of participating players.

66. A method of operation of a server system as claimed in claim 65 that includes the additional step of legislating access at any time to any instance of the multiplayer zero-sum game by any would-be player requesting participation in the multiplayer zero-sum game, as a function of a number of players participating in that instance of the multiplayer zero-sum game.

67. A method of operation of a server system as claimed in claim 66 in which participation is enabled in any instance of the game by players requesting participation in the multiplayer zero-sum game through any one of the plurality of portals.

68. A method of operation of a server system as claimed in claim 67 in which data corresponding to each participating player in every instance of the multiplayer zero-sum game is included in the register, the data being representative of an instance of the multiplayer zero-sum game in which that player is participating, and representative of a corresponding portal through which that player accessed the gaming server.

69. A method of operation of a server system as claimed in claim 64 that includes the additional step of establishing a sub-register corresponding to each portal, the sub-register containing details of players participating in any instance of the multiplayer zero-sum game through that portal.

70. A method of operation of a server system as claimed in claim 69 in which a credit account is maintained corresponding to each player included in the sub-register of players.

71. A method of operation of a server system as claimed in claim 70 that includes the steps of dispensing purchased credit to any player participating in any instance of the multiplayer zero-sum game in order to play the multiplayer zero-sum game, and crediting the credit account of any player who has purchased credit by an amount equivalent to the credit purchased by that player.

72. A method of operation of a server system as claimed in claim 70, further comprising debiting each entity's clearing account for each player accessing that entity's portal who has made an unsuccessful wager on the turn of an instance of the multiplayer zero-sum game by an amount equivalent to the magnitude of that player's wager.

73. A method of operation of a server system as claimed in claim 72 in which a portion of the total of all the wagers on the turn of the instance of the multiplayer zero-sum game is withheld as a rake.

74. A method of operation of a server system as claimed in claim 73, further comprising crediting an entity's clearing account associated with a player who has made a successful wager on the turn of the instance of the multiplayer zero-sum game with an amount equivalent to the total of all the unsuccessful wagers in that turn, less the rake.

75. A method of operation of a server system as claimed in claim 74 in which the credit account of any player who has made a wager on the turn of the instance of the multiplayer zero-sum game is debited by an amount equivalent to the magnitude of the wager.

76. A method of operation of a server system as claimed in claim 75 in which the credit account of any player who has made a successful wager on the turn of the instance of the multiplayer zero-sum game is credited by an amount equivalent to the total of all the wagers inclusive of the successful wager, less the rake.

77. A method of operation of a server system as claimed in claim 73 in which at least a portion of the rake in the turn of the instance of the multiplayer zero-sum game is credited to each entity's clearing account as a function of a proportion of players participating in the turn through a portal of that entity.

78. A method of operation of a server system as claimed in claim 73 in which the rake withheld from the total of all the wagers on each turn of the multiplayer zero-sum game is set to zero.

79. A method of operation of a server system as claimed in claim 72, further comprising adjusting the balance of each clearing account only after a plurality of turns of any instance of the multiplayer zero-sum game as a function of outcomes of the plurality of turns.

80. A method of operation of a server system as claimed in claim 64 in which each entity's clearing account has a corresponding minimum threshold balance.

81. A method of operation of a server system as claimed in claim 80 in which all players accessing a portal of an entity having a clearing account balance that is less than its respective minimum threshold are suspended from further participation in any instance of the multiplayer zero-sum game.

82. A method of operation of a server system as claimed in claim 64 in which the multiplayer zero-sum game is a game of multiplayer poker.

* * * * *